US007282661B2

United States Patent
Ulrich et al.

(10) Patent No.: US 7,282,661 B2
(45) Date of Patent: Oct. 16, 2007

(54) APPARATUS FOR DETECTING CONNECTION OF A WELDED STUD TO A STUD WELDING GUN

(75) Inventors: Mark Ulrich, New London, WI (US); Sean P. Moran, Neenah, WI (US); Warren Wran, Newbury Park, CA (US)

(73) Assignee: Illinois Tool Works Inc., Glenview, IL (US)

( * ) Notice: Subject to any disclaimer, the term of this patent is extended or adjusted under 35 U.S.C. 154(b) by 383 days.

(21) Appl. No.: 10/904,168

(22) Filed: Oct. 27, 2004

(65) Prior Publication Data

US 2006/0086696 A1 Apr. 27, 2006

(51) Int. Cl.
*B23K 9/20* (2006.01)
(52) U.S. Cl. .................................................. 219/98
(58) Field of Classification Search .............. 219/98, 219/99
See application file for complete search history.

(56) References Cited

U.S. PATENT DOCUMENTS

| 3,546,420 | A | * | 12/1970 | Ettinger et al. ............... 219/98 |
| 3,582,602 | A | | 6/1971 | Ettinger et al. |
| 3,586,814 | A | | 6/1971 | Pease |
| 4,417,120 | A | * | 11/1983 | Lumbra et al. ............... 219/98 |
| 4,456,808 | A | | 6/1984 | Wilkinson et al. |
| 4,804,811 | A | | 2/1989 | Raycher et al. |
| 4,988,842 | A | * | 1/1991 | Van Allen .................... 219/98 |
| 6,998,564 | B2 | * | 2/2006 | Papke et al. .................. 219/98 |

FOREIGN PATENT DOCUMENTS

| EP | 1468773 A2 | 10/2004 |
| GB | 2103136 A | 2/1983 |
| WO | 03015974 A1 | 2/2003 |

* cited by examiner

*Primary Examiner*—Clifford C. Shaw
(74) *Attorney, Agent, or Firm*—Ziolkowski Patent Solutions Group, SC

(57) ABSTRACT

A welding apparatus is presented that includes a post-firing detection system and control connected to communicate with the post-firing detection system such that a stud welding gun is prevented from activation if a recently fired welding stud remains connected to the stud welding gun.

20 Claims, 4 Drawing Sheets

APPARATUS FOR DETECTING CONNECTION OF A WELDED STUD TO A STUD WELDING GUN

BACKGROUND OF THE INVENTION

The present invention relates generally to welding systems and, more particularly, to a stud welder having a post-firing stud connection detector system and control to inhibit subsequent firing of a welding stud gun if a recently fired welding stud is deemed connected to the stud welding gun.

Stud welding is a welding process that utilizes a localized burst of current between a metallic fastener and a metallic workpiece. In most instances, although not required, the fastener and the workpiece have the same material properties. The fasteners are held and welded in place through the use of an electro-mechanical device known as a stud gun. The stud gun typically has a chuck that holds the metallic fastener in place. A stud welding system generally has a power source, a stud gun, a pair of cables, and a stud.

Stud welding has applications in many industries. These industries include boiler manufacturing, shipbuilding, auto manufacturing, and construction to name but a few. The work environment in each of these trades is often polluted with dust, dirt, and debris and heavily congested with other equipment and tools. Any equipment operated under these conditions preferably should be designed with these conditions in mind in order to allow easy transport and to extend the life cycle of the equipment.

During welding a stud it is possible for the stud gun to not release the welding stud despite the stud having been welded to the workpiece. In such a situation, the chuck of the stud gun maintains at least partial retention of the welding stud. When this post-firing connection of the welding stud and stud welding gun occurs, it is not uncommon for an operator to re-trigger the stud welding gun while making attempts to dislodge the stud from the gun. Allowing this re-triggering has drawbacks.

Re-firing of the stud welding gun while attempting to release a stud already welded can cause damage to the stud welding gun as well as the welded stud. That is, with re-firing of the stud welding power source, it is possible to draw an arc between the stud welding gun and the welded stud as the operator draws or otherwise removes the stud welding gun from the head of the welded stud. As a result, a welding arc is formed between the stud welding gun and the welded stud. It is undesirable for both the gun and the stud to create an arc between the welded gun and the welded stud. Additionally, inadvertently drawing an arc between the welding stud gun and the welded stud can cause an unplanned arc flash.

Therefore, it would be desirable to have a system that detects connection of a welded stud to a stud welding gun. It would be further desirable to incorporate a control in a stud welder such that the stud welding gun cannot be fired if a welded stud remains connected to the stud welding gun.

BRIEF DESCRIPTION OF THE INVENTION

The present invention provides a system and method of detecting post-firing connection of a welded stud to a stud welding gun and preventing re-firing of the stud welding gun during post-firing connection that overcomes the aforementioned drawbacks.

A stud welder is presented that includes a post-firing detection system and control connected to communicate with the post-firing detection system such that a stud welding gun is not re-fired or otherwise activated if a welded stud remains connected to the stud welding gun. A non-welding signal transmitted to the stud welding gun may be used to determine connection of a welded stud or a detector placed in proximity to the stud welding gun may also be used to provide feedback regarding connection of a welded stud to the stud welding gun. With the former, a relatively low amperage signal can be transmitted from the stud welder to the stud welding gun. If a short circuit is deemed present between the stud welding gun and the welded stud, the control inhibits subsequent firing of the stud welding gun. In this regard, when a short is detected, the control deems that the welded stud and the stud welding gun are in contact. An open circuit condition is indicative of disconnection between the stud welding gun and the welded stud. With the latter, a proximity sensor, such as an electromagnetic coil, is placed and constructed to provide feedback to the control indicative of connection of a welded stud to the stud welding gun. In this regard, after the stud welding gun is fired, or otherwise triggered, the proximity sensor is activated to provide feedback. In the case of an electromagnetic coil, a change in current indicates whether a welded stud remains connected to the stud welding gun.

Therefore, in accordance with one aspect, the present invention includes a stud welder having a power source and a stud welding gun configured to deliver a welding stud to a workpiece. The stud welder also includes a controller configured to prevent firing of the stud welding gun if the stud welding gun remains connected to a recently fired welding stud and the workpiece.

In accordance with a further aspect, the present invention includes a control to inhibit firing of a stud welding gun. The control includes a post-firing feedback loop designed to provide feedback regarding connection status of a welded stud and a stud welding gun. A controller is provided and designed to receive and process the feedback, and disable firing of the stud welding gun if the stud welding gun is in contact with a welded stud.

According to another aspect of the present invention, a welding apparatus includes means for delivering a welding stud to a workpiece and means for determining connection of the welding stud to the delivering means following activation of the delivering means. The welding apparatus further includes means for preventing future activation of the delivering means if the determining means provides an output indicating post-activation connection of the welding stud to the delivering means.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
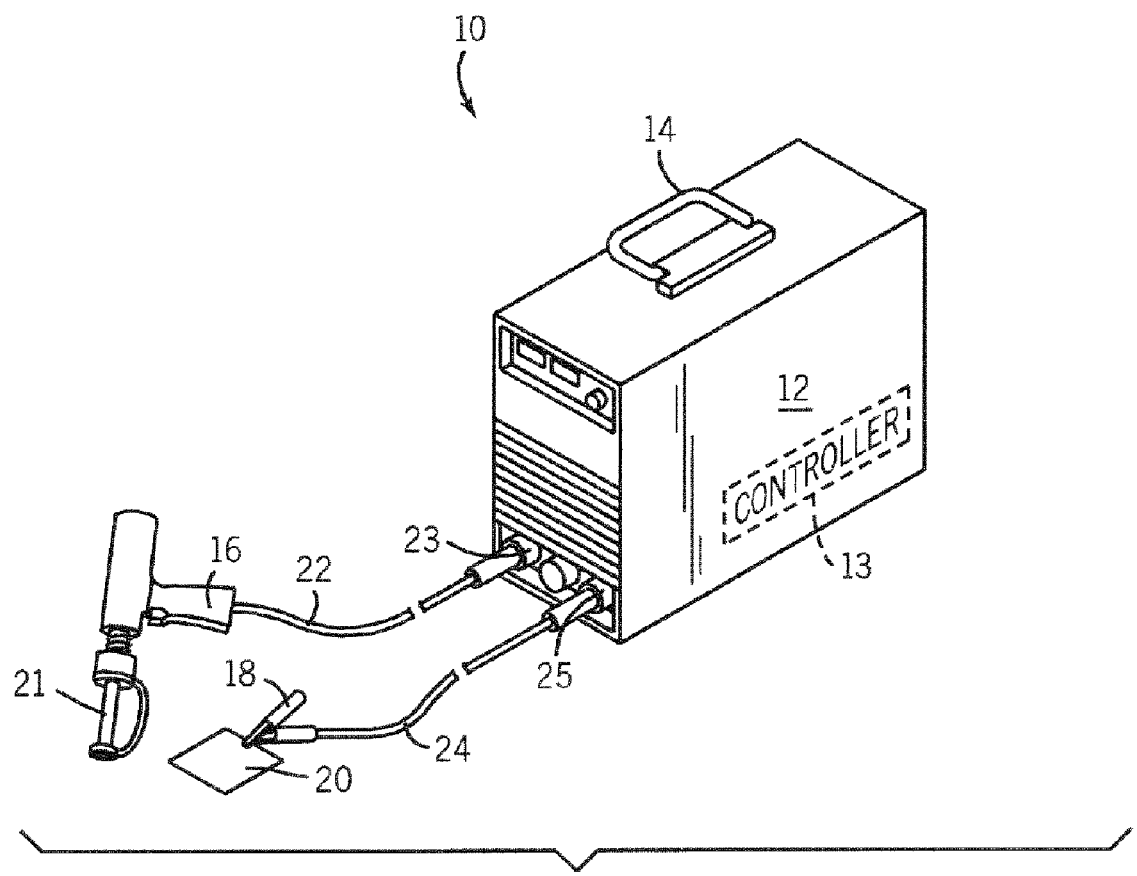
FIG. 1 is a perspective view of a stud welder apparatus incorporating the present invention.

FIG. 1 shows a stud welding system 10 incorporating the present invention in one embodiment. Stud welding system 10 includes a housing 12 enclosing the internal components of the welding power source including a controller 13 for controlling operation of the power source as well as a post-firing welding stud retention system. The stud welding system 10 is of such compact construction, that it includes a pair of handles 14 for easily transporting the welding system from one location to another. To effectuate the welding process, the stud welding system 10 includes a stud welding gun 16 as well as a work clamp 18. The work clamp 18 is configured to complete the welding circuit to a workpiece 20 to be welded. A pair of cables 22 and 24 connects the stud welding gun 16 and work clamp 18 to the housing via output terminals 23 and 25, respectively. As will be described, cables 22 and 24 are used to provide feedback to controller 13 regarding a connection status of a welding stud 21 to the stud welding gun 16.

The present invention is directed to a post-firing detection system designed to provide feedback regarding the status of a recently fired welding stud. More particularly, the present invention is directed to a stud welding gun-welded stud detection system that provides feedback to the controller indicating whether the stud welding gun remains connected to a stud despite that stud being weld to a workpiece. While a number of detection systems are contemplated, two exemplary systems will be described.

Figure 2:
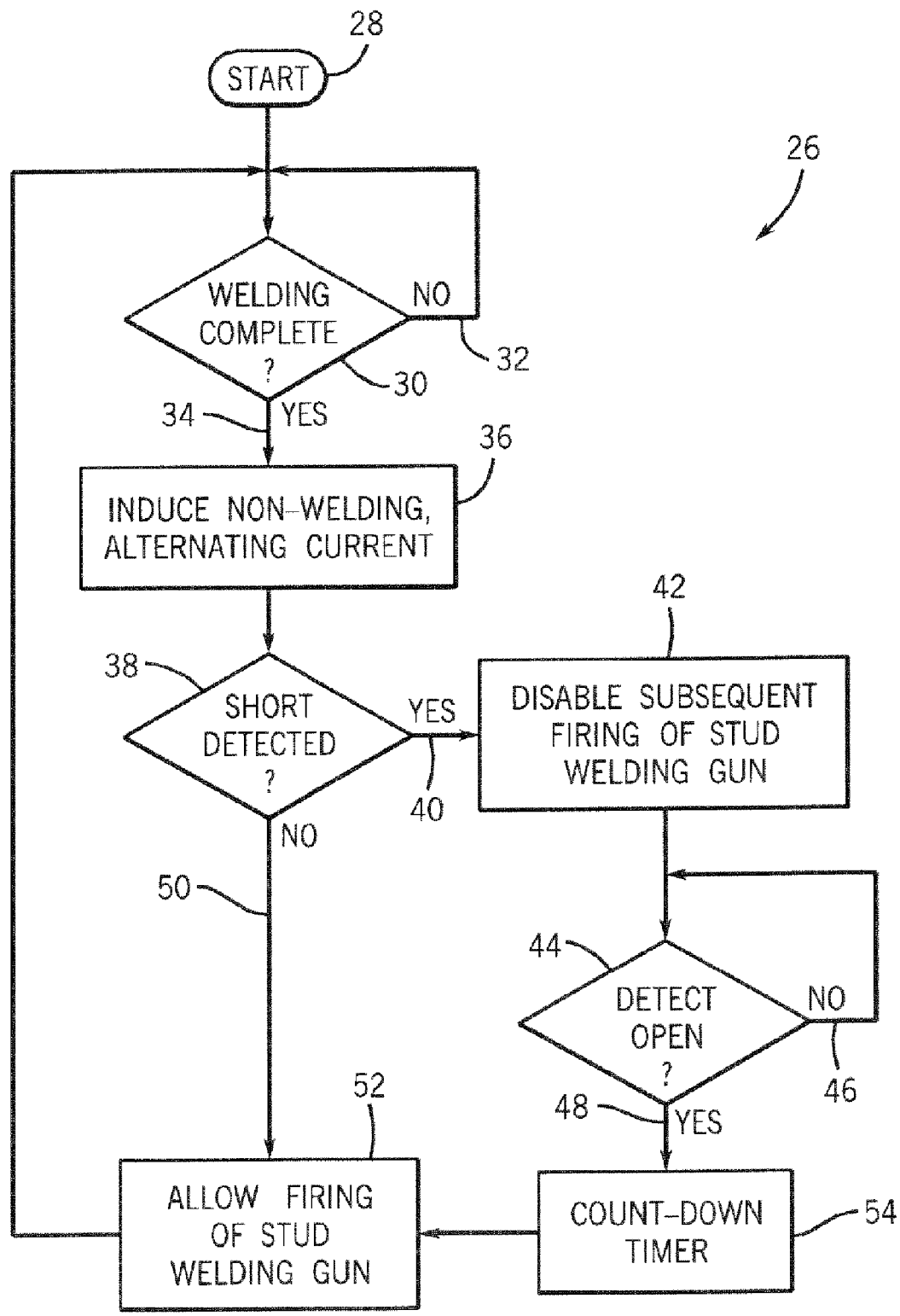
FIG. 2 is a flow chart setting forth the steps of a technique to determine connectivity of a welding gun to a welded stud and to prevent firing of the welding gun when the welding gun is connected to a welded stud.

It is contemplated that a sensor-less system may be used to detect retention of a welded stud in the chuck of a stud welding gun following firing of the stud welding gun. In this sensor-less system, detection of a retained welded stud is achieved through output terminal voltage sense leads rather than a dedicated sensory component. The acts of a sensor-less detection and prevention technique 40 are illustrated in FIG. 2. Technique 26, which may be carried out using software, firmware, hardware, or a combination thereof, is initiated at 28 following completion of a welding cycle. In this regard, the connectivity detection technique determines if a welding cycle is complete at 30. If not 30, 32, technique 26 loops back and remains idle until a welding cycle is complete. On the other hand, if a welding cycle is complete 30, 34, a sense voltage is monitored across the output terminals of the power source. In this regard, voltage is induced across the weld cables such that a low energy current flows through the weld cables 36. It is preferred that the current be relatively small in amplitude so as to not be sufficient to induce welding, e.g. approximately 1 mA. Following induction of the non-welding current, the presence of a short or open condition across the output terminals of the power source is determined 38. If a short is detected 38, 40, e.g. little or no voltage differential has developed across the output terminals, controller 13, which is programmed to monitor the signal, deems that a welded stud remains retained in the chuck of the stud welding gun.

If a short circuit condition is detected 38, 40, the controller, using software, firmware, hardware, and/or a combination thereof, will inhibit the welding gun from firing 42. This inhibition of the stud welding gun will remain in effect until an open circuit condition is detected across the output terminals 44. That is, if an open circuit is not detected 44, 46, welding power will not be deliverable to the stud welding gun. On the other hand 44, 48, if there is an open circuit between the stud welding gun and the workpiece, a voltage signal will be detected at the output terminals of the power source. This voltage will alternate with the signal and be indicative of a disconnection between the stud welding gun and the welded stud. Accordingly, controller 13 will inhibit the stud welding gun from firing until after a small alternating voltage is detected across the output terminals of the stud welder. If a short is not detected 38, 50 the controller will deem that the chuck of the stud welding gun released the stud after the welding cycle and, as such, allow subsequent firing of the stud welding gun 52 and delivery of welding power to the weld.

In a further embodiment, the gun will not be allowed to re-fire until expiration of a pre-set period of time after the welding of a stud and the alternating voltage is detected 54. For instance, controller 13 will initiate countdown of a pre-set timer after an alternating voltage is detected. Once the timer has completed countdown, the gun will be allowed to fire the next welding stud 52. In this regard, the operator will not draw an inadvertent arc between the welded stud and the stud gun chuck while trying to dislodge the welded stud from the chuck. Technique 26 then loops back to step 30 and is repeated at the completion of the next welding cycle.

As stated previously, the controller is programmed to inhibit re-firing of the stud welding gun if a stud remains in contact with the stud welding gun, and, in particular, remains retained within the stud welding gun chuck after a welding cycle is complete. It is contemplated that a number of techniques may be implemented to prevent re-firing of the stud welding gun when connected to a welded stud. For instance, controller 13 may control the internal components of the power source such that a welding voltage is not available until controller 13 deems that the stud welding gun is clear from the welded stud. In a further embodiment, the trigger of the stud welding gun may be mechanically locked until the welded stud has been cleared from the chuck of the welding gun. It is also contemplated that the stud welding gun may be constructed to only fire once after a given welding stud is engaged by the chuck of the stud welding gun. In this regard, the welding gun will not re-fire until a new stud is engaged by the gun chuck. Regardless of the mechanism implemented, it is contemplated that software, hardware, as well as a combination thereof may be utilized to prevent firing of the stud welding gun if a recently fired welding stud remains engaged with the stud welding gun.

Figure 3:
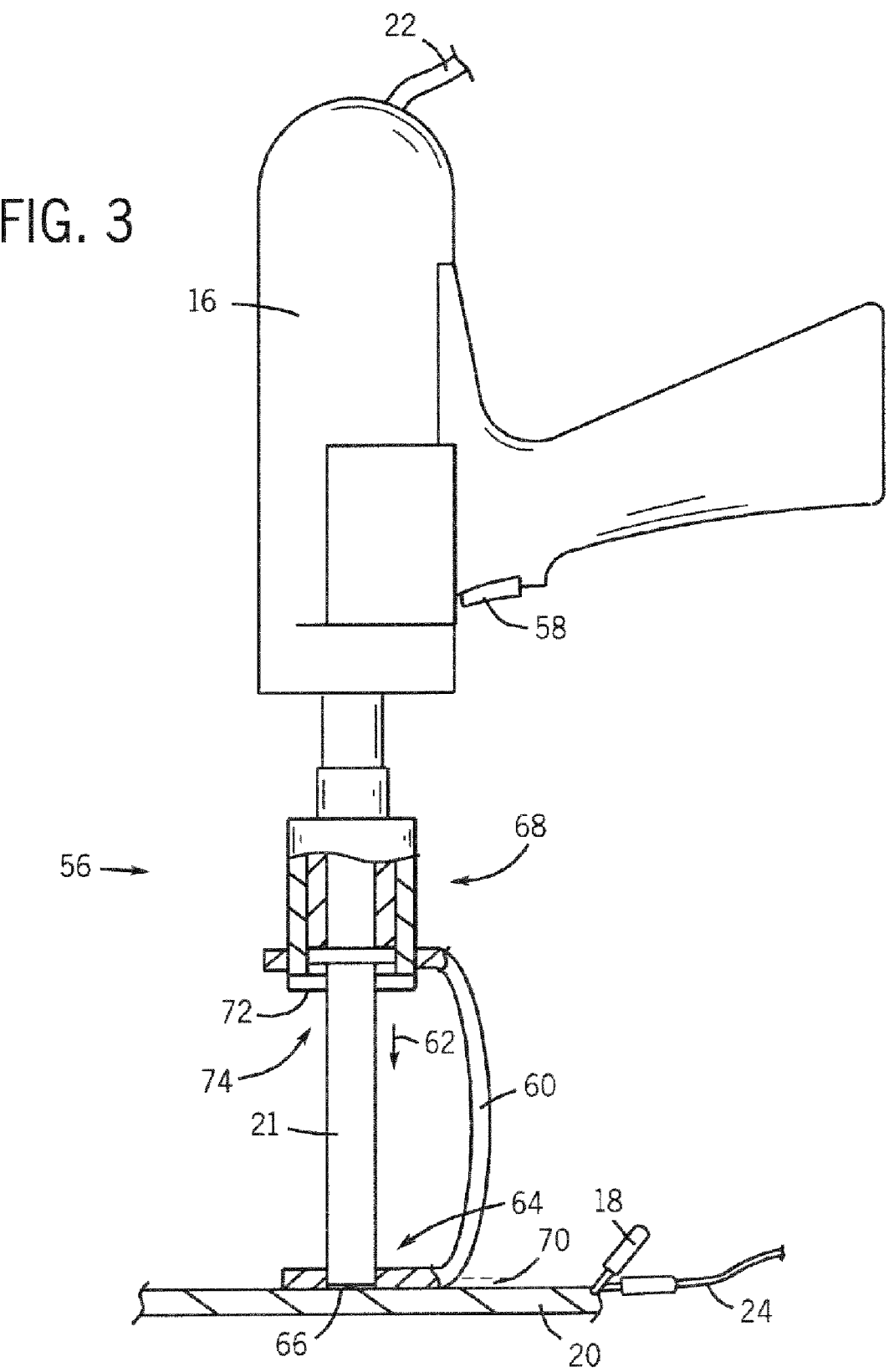
FIG. 3 is a side view of the stud welding gun of FIG. 1 in use.

The present invention also contemplates a sensor-based approach for determining connection of the stud welding gun to a welded stud. Prior to describing this sensor-based implementation, the components of an exemplary stud welding gun will be described. As shown in FIG. 3, a stud 21 to be welded is initially placed in a work end 56 of stud welding gun 16 and in abutting engagement with workpiece 20. When a trigger 58 of stud welding gun 16 is pressed, a welding current is developed between the welding gun 16 and workpiece 20 through stud 21. An arm 60 of stud welding gun 16 is used to accommodate stud 21 and allow drawing stud 21 away from workpiece 20 to form a stud welding arc. As electrical current 62 passes through stud 21 and workpiece 20, a distal end 64 of stud 21 and a target point 66 of workpiece 20 become molten. A chuck 68 of stud welding gun 16 retains stud 21 and maintains a distance 70 between stud 21 and workpiece 20. Distance 70 is determined to be the distance required to form a proper welding arc between the stud 21 and workpiece 20. After a predetermined time, stud 21 is driven into workpiece 20 thereby forming a homogenous weld between stud 21 and workpiece 20. Although a specific stud welding gun and stud are shown, it is understood that such is merely by way of example. Such is not intended to limit the scope of the claims presented herein.

Following stud 21 being driven into the workpiece, chuck 68 is designed to be easily removed from stud 21. It is possible that chuck 68 will be left attached to a stud after the stud has been welded to the workpiece. Consequently, it is possible with known stud welding systems for the operator to re-trigger or otherwise re-activate the welding power source while trying to dislodge the chuck from the stud. This reactivation of the welding power source with the stud retained in the chuck of the gun while attempting to separate the gun and welded stud can cause an inadvertent welding arc—which may be damaging to the gun or stud.

Therefore, in an alternative embodiment, the stud welding gun includes a dedicated proximity sensor to detect connectivity of the gun to a welded stud. The welding gun 16 may be originally equipped or be retrofitted to include the proximity sensor or pick-up device 72. In a preferred embodiment, a coil 72 is positioned at a distal end 74 of the gun. Current passing through the coil is used to provide feedback to controller 13 of FIG. 1 as to post-firing connection of the stud and gun chuck. In this regard, when the metallic stud is connected to or otherwise engaged with the chuck and is therefore placed in proximity to the coil, the current flowing through the coil will vary as a result of the electromagnetic properties of the coil and metallic stud. As such, controller 13, from the current flowing through the coil, is able to determine that the stud is connected to the chuck and prevent re-firing of the stud welding gun with the welded stud retained by the gun.

It is contemplated, however, that additional sensory devices may be used to detect retention of the welding stud in the stud welding gun. In a further embodiment, the stud welding gun may include a cover (not shown) that is resiliently placed over the outlet of the gun and is designed to be slidably removed from the outlet when a welding stud is retained in the chuck. In this regard, sensors that respond to translation or movement of the cover may provide a signal indicative of cover plate displacement. This may be characterized by controller 13 as retention of the welded stud in the chuck of the stud welding gun. It is also contemplated that pressure and optical sensors may also be used to provide feedback regarding retention of a welded stud in the stud welding gun.

Figure 4:
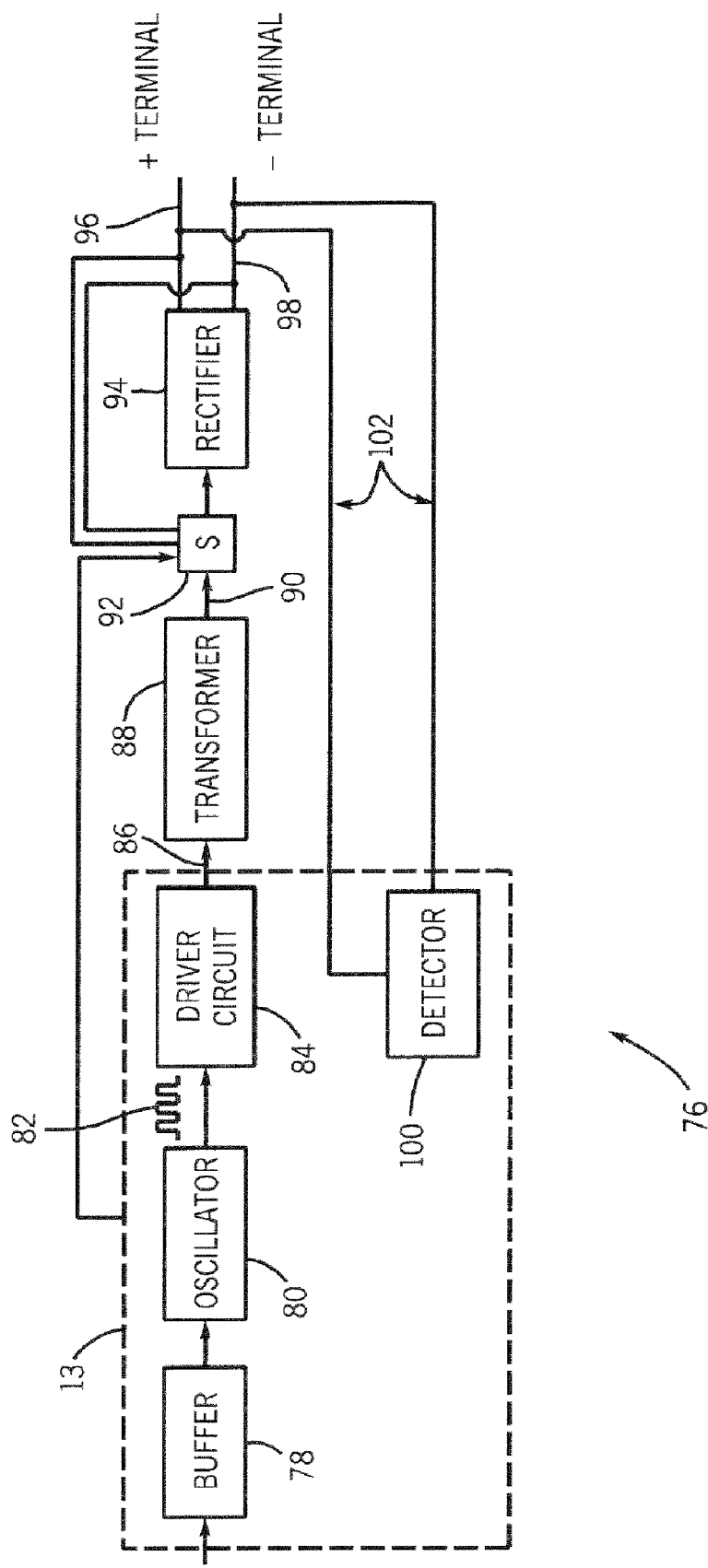
FIG. 4 is a block diagram of a gun-welded stud connectivity system according to the present invention.

Referring now to FIG. 4, a block diagram of a gun-welded stud connectivity detection system 76 according to the present invention is illustrated. Detection system 76 includes controller 13 that includes a buffer 78 to isolate the power source from the weld and an oscillator 80 to provide a square wave output 82 that is input to driver circuit 84. The output 86 of driver circuit 84 controls operation of transformer 88. Transformer 88 provides a secondary power output 90 at a level sufficient for welding during a welding cycle as well as provide a sense voltage after a welding cycle.

In this regard, detection system 76 includes a switch 92 controlled by controller to direct the output 90 of transformer 88. During welding, switch 92 routes output 90 to a rectifier 94 that is configured to convert AC output 90 to a DC signal suitable for stud welding. This DC output is then applied across output terminals 96 and 98 for connection to weld cables. However, as described above, the present invention includes the application of a low energy AC signal across terminals 96 and 98 to determine if the stud welding gun remains connected to a welding stud despite that stud having been welded to a workpiece. As such, switch 92 is controlled by controller 13 to route the output 90 of the transformer directly to output terminals 96 and 98 after a welding cycle is complete. During this stud detection phase, transformer 88 is driven to provide a low energy, non-welding AC output that can be used to measure an alternating voltage across terminals 96 and 98. Accordingly, controller 13 includes a detector 100 that monitors the voltage across the output terminals. The voltage across terminals 96 and 98 is input to detector 100 via feedback loop 102. While application of an AC signal is described above, it is recognized that a non-welding DC signal may also be used to determine connectivity of the welded stud to the stud welding gun. Additionally, as described above, a proximity sensor may be implemented to provide feedback to the controller instead of a sense voltage. Regardless of implementation, the controller is programmed to disable subsequent firing of the stud welding gun if the gun remains connected to a stud that has been weld to a workpiece.

Therefore, the present invention includes a stud welder having a power source and a stud welding gun configured to deliver a welding stud to a workpiece. The stud welder also includes a controller configured to prevent firing of the stud welding gun if the stud welding gun remains connected to a recently fired welding stud and the workpiece.

The present invention also includes a control to inhibit firing of a stud welding gun. The control includes a post-firing feedback loop designed to provide feedback regarding connection status of a welded stud and a stud welding gun. A controller is provided and designed to receive and process the feedback, and disable firing of the stud welding gun if the stud welding gun is in contact with the welded stud.

A welding apparatus is also presented and includes means for delivering a welding stud to a workpiece and means for determining connection of the welding stud to the delivering means following activation of the delivering means. The welding apparatus further includes means for preventing future activation of the delivering means if the determining means provides an output indicating connection of the welded stud to the delivering means.

The present invention has been described in terms of the preferred embodiment, and it is recognized that equivalents, alternatives, and modifications, aside from those expressly stated, are possible and within the scope of the appending claims.

What is claimed is:

1. A stud welder comprising:
   a power source;
   a stud welding gun connected to the power source and having a trigger, the stud welding gun configured to deliver a welding stud to a workpiece; and
   a controller connected to the power source and the stud welding gun to cause welding of the welding stud to the workpiece upon activation of the trigger of the stud welding gun, then sense if the stud welding gun remains connected to the welded stud and the workpiece, and if so, prevent firing of the stud welding gun until the welded stud and the workpiece are separated from the stud welding gun.

2. The stud welder of claim 1 further comprising a proximity sensor configured to provide feedback to the controller as to proximity of the recently fired welding stud to the stud welding gun.

3. The stud welder of claim 2 wherein the stud welding gun includes a chuck designed to hold a welding stud and wherein the proximity sensor includes a coil positioned at a distal end of the chuck.

4. The stud welder of claim 1 further comprising output terminals connecting the stud welding gun and workpiece to the power source and wherein the controller is further configured to determine stud welding gun connection to a recently fired welding stud from a voltage across the output terminals of the stud welding gun.

5. The stud welder of claim 4 wherein the controller is further configured to prevent re-firing of the stud welding gun if a voltage differential is not detected across the output terminals.

6. The stud welder of claim 5 further comprising a weld cable connecting the power source and the stud welding gun and wherein the controller is further configured to cause a non-welding current to flow through the weld cable following firing of the stud welding gun.

7. The stud welder of claim 6 wherein the non-welding current is alternating and has an amperage of approximately 1 mA.

8. The stud welder of claim 1 wherein the controller is further configured to inhibit arc formation between the stud welding gun and a welded stud connected to the stud welding gun.

9. A control to inhibit firing of a stud welding gun, the control comprising:
   a post-firing feedback loop designed to provide feedback regarding connection status of a welded stud and a stud welding gun; and
   a controller designed to receive and process the feedback, and disable firing of the stud welding gun if the stud welding gun is in contact with the welded stud.

10. The control of claim 9 further comprising a proximity sensor configured to provide the feedback regarding the connection status of the welded stud and the stud welding gun.

11. The control of claim 10 wherein the proximity sensor includes a pick-up device.

12. The control of claim 10 wherein the proximity sensor includes a coil positioned at a distal end of a chuck of the stud welding gun.

13. The control of claim 9 wherein the controller is designed to disable firing of the stud welding gun if a short circuit exists between the stud welding gun and the welded stud.

14. The control of claim 9 wherein the controller is further designed to disable firing of the stud welding gun for a given period of time after firing of a welding stud.

15. The control of claim 14 wherein the controller is further designed to begin countdown of the given period only after a low AC voltage is detected via the post-firing feedback loop.

16. A welding apparatus comprising:
   means for delivering a welding stud to a workpiece;
   means for determining connection of the welding stud to the delivering means following activation of the delivering means; and
   means for preventing future activation of the delivering means if the determining means provides an output indicating post-activation connection of the welding stud to the delivering means.

17. The welding apparatus of claim 16 further comprising means for sensing relative position of the delivering means to a delivered welding stud.

18. The welding apparatus of claim 16 further comprising means for providing feedback to the preventing means regarding post-activation connection of the welding stud to the delivering means.

19. The welding apparatus of claim 16 further comprising means for preventing arc formation between the delivering means and a welded stud if the determining means provides an output indicating post-activation connection of the welded stud to the delivering means.

20. The welding apparatus of claim 16 further comprising means for preventing re-triggering of a stud welding gun if a previously delivered welding stud is deemed connected to the stud welding gun.

* * * * *